No. 788,865. PATENTED MAY 2, 1905.
S. J. WEBB.
METHOD OF COMPRESSING BALES.
APPLICATION FILED NOV. 16, 1900.
3 SHEETS—SHEET 1.

No. 788,865. PATENTED MAY 2, 1905.
S. J. WEBB.
METHOD OF COMPRESSING BALES.
APPLICATION FILED NOV. 16, 1900.

3 SHEETS—SHEET 2.

No. 788,865. PATENTED MAY 2, 1905.
S. J. WEBB.
METHOD OF COMPRESSING BALES.
APPLICATION FILED NOV. 16, 1900.
3 SHEETS—SHEET 3.
Fig. 3.
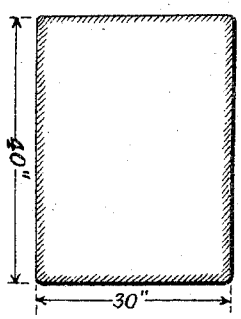
Fig. 3.ª
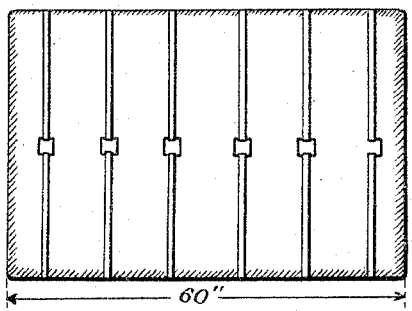
Fig. 4.
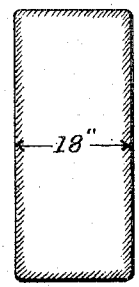
Fig. 4.ª
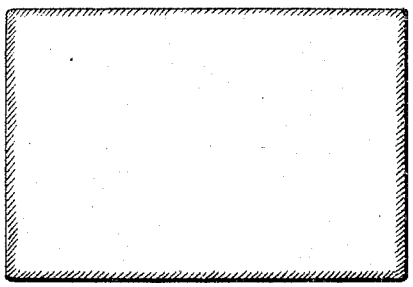
Fig. 5.
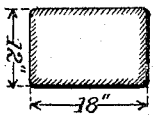
Fig. 5.ª
Fig. 6.
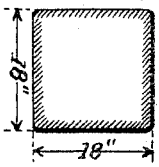
Fig. 6.ª
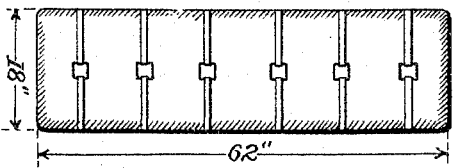
Witnesses
J. G. Hinkel
H. M. Gillman, Jr.
Inventor
Samuel J. Webb
By Foree Freeman
Attorneys No. 788,865. Patented May 2, 1905.

UNITED STATES PATENT OFFICE.

SAMUEL J. WEBB, OF MINDEN, LOUISIANA.

METHOD OF COMPRESSING BALES.

SPECIFICATION forming part of Letters Patent No. 788,865, dated May 2, 1905.

Application filed November 16, 1900. Serial No. 36,740.

*To all whom it may concern:*

Be it known that I, SAMUEL J. WEBB, a citizen of the United States, residing at Minden, in the parish of Webster and State of Louisiana, have invented certain new and useful Improvements in Methods of Compressing Bales, of which the following is a specification.

My invention relates to a new and improved method of compressing bales of cotton or other material; and it has for its object to provide an improved method whereby the bales may be quickly compressed and the material thereof condensed to a high density and the bale confined and tied while under pressure and in a highly-condensed condition; and to these ends my invention consists in the various steps and combinations of steps constituting a new mode of operation for accomplishing the results desired in substantially the manner hereinafter more particularly set forth.

In the accompanying drawings I have illustrated in a general way means whereby my improved method may be carried out, in which—

Figure 1:
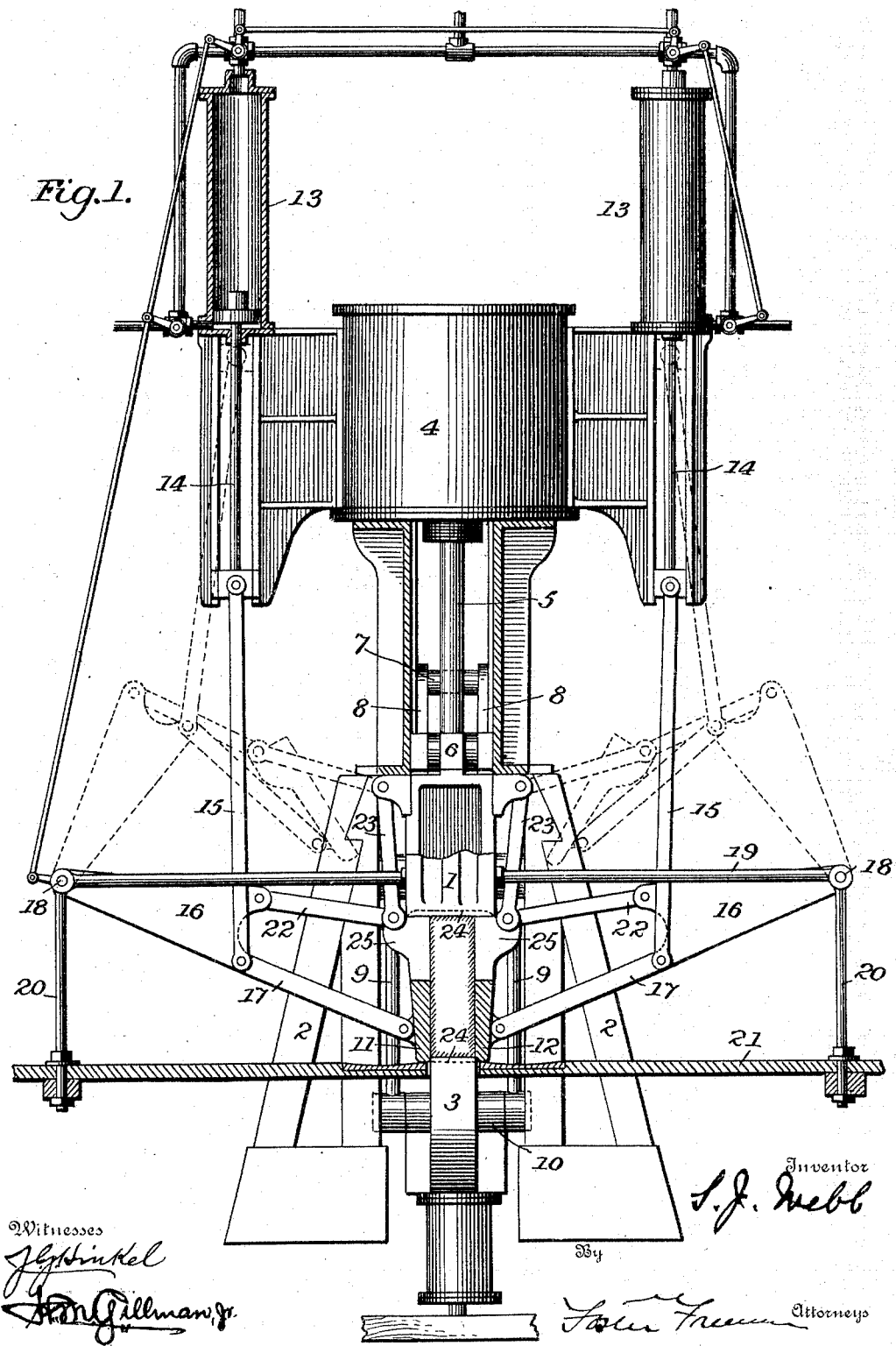
Figure 2:
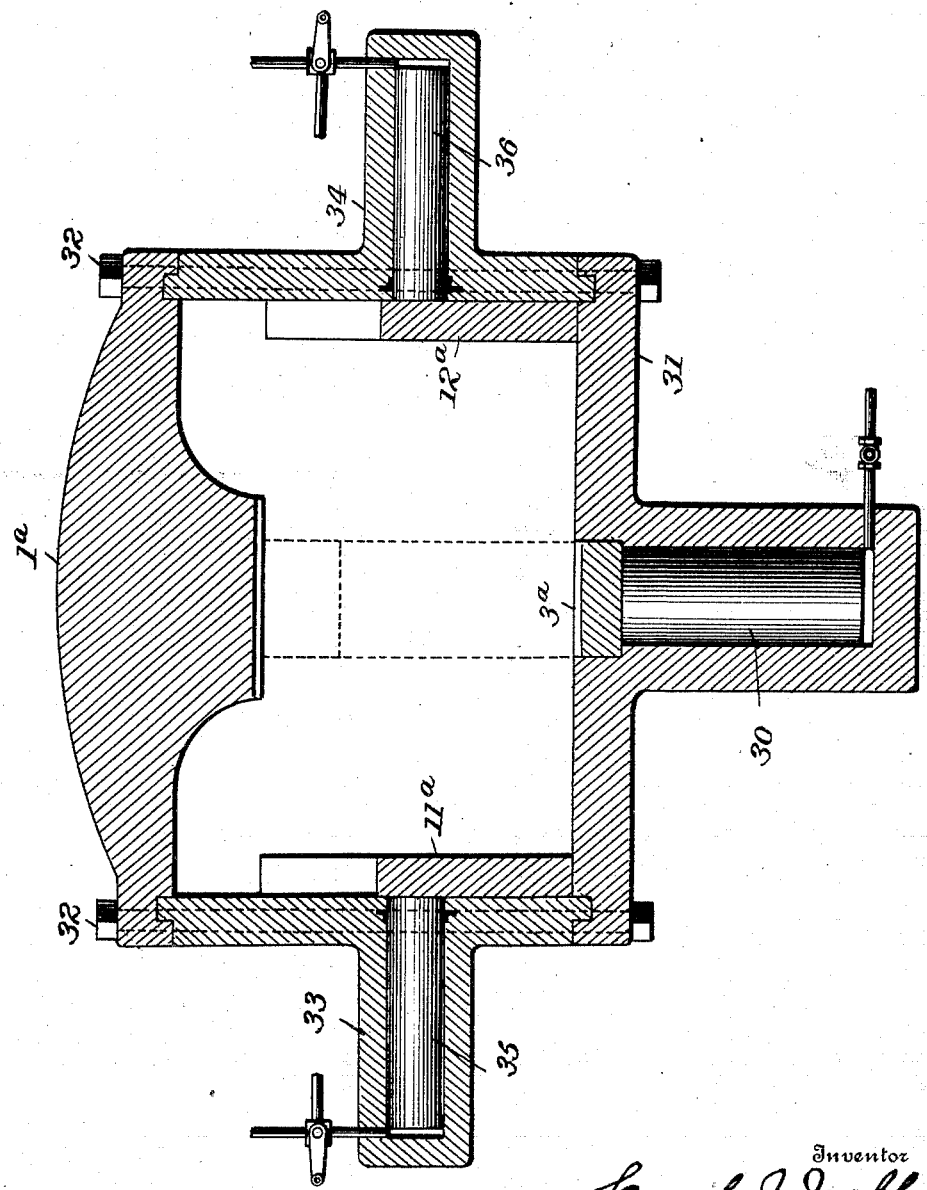

Figure 1 is a sectional view showing enough of an apparatus to enable its general principles to be understood. Fig. 2 is a sectional view of a modified apparatus by means of which the method may be carried out. Figs. 3 and 3ª are respectively end and side views of an ordinary plantation-bale with the bands applied. Figs. 4 and 4ª represent such a bale after the bands are removed and it has been compressed in the direction of its sides. Figs. 5 and 5ª are respectively end and side views of a bale after it has been compressed in a direction transverse to the first compression; and Figs. 6 and 6ª are end and side views, respectively, of such a compressed bale after it has been banded and the pressure removed.

It will be understood that the particular means shown form no part of my present invention and are only illustrated and described with sufficient particularity to indicate in a general way how my improved method may practically be utilized in the art and sufficient to enable those skilled in the art to practice my invention.

In the ordinary handling of cotton, as is well known, it is common to form or arrange the cotton in bales in the field or on the plantation, and the cotton in the form of bales is usually subjected to more or less pressure, and it is often pressed so that the density of the bale is in the neighborhood of ten pounds to the cubic foot, more or less, and these are known as "field" or "plantation" bales. It is also common to take these field or plantation bales and subject them to greater pressure in a hydraulic, steam, or other compress, in which the density of the bale is greatly increased and which produces what is known as a "compressed" bale ready for shipment.

To illustrate in a general way, in ordinary practice it is usual for each bale to contain about five hundred pounds of cotton, and as it is pressed on the plantation the general dimensions of the bale may be given as thirty by forty by sixty inches, these dimensions varying more or less, according to circumstances, and the density of these bales depends generally upon the character of the plantation-press. In ordinary practice these plantation-bales are subjected to a compress compressing the bale in but one direction and compressing it over the whole surface at a single operation, and the dimensions of the bale are reduced so that they may be said to be substantially thirty inches in width from side to side by fifteen to twenty-four inches in thickness from top to bottom by sixty inches in length. This compression of the plantation-bale is in the direction of the pressure of the farm-press, or, in other words, is in the direction of the top and bottom of the bale. In ordinary practice the length and width of the compressed bale remain substantially the same as the plantation-bale; but the thickness—that is, between the top and bottom—is largely reduced, and the density of the mass may vary from twenty-two and one-half to about thirty pounds per cubic foot. In order to accomplish this reduction in thickness and increased density when the bale is compressed over its entire surface at a single operation, it is necessary to subject the bale to enormous pressure, amounting to two thousand tons, more or less.

In the compresses ordinarily used, as above intimated, there are limits beyond which it has been found impracticable to condense the bale; and one of the main objects of my improvement is to provide a new method of compressing the bale, whereby a greater density of the mass may be obtained, the density being increased from thirty to fifty per cent. over the results attained in the ordinary method, using reciprocating compresses and compressing the whole surface of the top and bottom of the ordinary plantation-bale at once. In order to accomplish this by my method, I compress the plantation or other bale in two directions—that is, in the direction of its breadth or width between its sides and then in the direction of its thickness between its top and bottom—or reverse the order of these steps all at one operation without changing the relative position of the bale while being operated on—that is, without turning it from one side to the other—and completing the whole compression as a continuous operation without intermediate handling of the bale. Thus I compress the bale in one direction, either in the direction of its thickness or breadth, and retain or hold it under such pressure against its tendency to expand, and then while so retained compress the bale in another direction substantially at right angles to the direction of the first compression, and then confine the bale against expansion in the direction of both pressures by banding or tying the bale while under pressure in one or both directions.

Referring to Fig. 1 of the drawings, wherein I have illustrated the main operating parts of a compress which can be used in carrying out my invention, and which compress is more fully and completely described and illustrated in my application Serial No. 2,321, 1 represents a fixed bed or platen mounted in a suitable framework and base 2. The movable platen 3 is adapted to be operated by an engine 4, the piston-rod 5 of which is connected to a cross-head 6, and this cross-head is connected to a lever 7, and links 8 connected to lifting-rods 9, which in turn are connected by a pin 10 to the lower platen 3. The details of these links and lever are not fully shown in this case, being fully shown in my former application, and they are only referred to as illustrative, as any other mechanism for operating the movable platen may be substituted, it being understood that the platen 3 moves to and from the fixed platen 1 to compress the bale in one direction.

Arranged to coöperate with the main bed and platen 1 and 3 are side platens 11 12, and these may be variously constructed and arranged and operated by any suitable mechanism in such a manner as to compress the bale in a direction transverse to the direction of compression between the fixed and movable platens 1 and 3. In the present instance these side platens are shown as being operated from steam-cylinders 13, the piston-rods 14 of which are provided with connecting-rods 15, connected to toggle-levers 16 17. In this instance the levers 16 are shown as supported on bearings 18, connected by rods 19, and standards 20, supported in the floor 21. The levers 17 are shown as extending from the levers 16 to the lower part of the platens 11 and 12, to which they are pivoted, and I also show links 22 extending between the upper parts of the side platens and the levers 16, and there are other links 23, connecting the side platens to fixed portions of the press, as more fully shown in the former application.

When the piston-rods 14 are operated in the proper direction, the side platens 11 and 12 are moved outward from each other and upward and assume positions shown in dotted lines, and when the piston-rods are moved to the positions shown in full lines the side platens are brought down on opposite sides of the fixed platen 1 and are then moved toward each other in a substantially right line, compressing the cotton between them, and as the toggle-levers 16 and 17 reach practically a straight line they act to hold and practically lock the side platens in their compressing positions, so that the bale compressed between them is held against expansion while it is being compressed between the fixed and movable platens 1 and 3.

Both of the platens 1 and 3 are provided with slots or grooves 24 to receive the balebands, and the upper portions of the side platens are also provided with slots 25 for the same purpose, all as more fully illustrated in my former application.

In Fig. 2 a hydraulically-operated compress is illustrated, in which $1^a$ is the stationary bed or platen, $3^a$ the movable platen, and $11^a$ $12^a$ the side platens similar to corresponding parts in Fig. 1. In this instance the platen $3^a$ is attached to a plunger 30, moving in a hydraulic cylinder formed in what may be the base 31 of the press, which is attached to the fixed platen $1^a$ in any suitable way, as by bolts 32. Secured to the fixed platen and base 31 are hydraulic cylinders 33 34, in the former of which is a plunger 35, connected to the side platen $11^a$, and in the latter a plunger 36, connected to the side platen $12^a$, and suitable means for operating these various plungers are indicated and will be understood by those skilled in the art.

In carrying out my improved method with a bale such as is above indicated and as shown in Figs. 3 and $3^a$ the bale is placed between the fixed bed or platen and its opposing movable platen, the bands being removed, and it is first subjected to pressure in the direction of its sides by means of the side platens, and the result of this pressure will be substantially that indicated in Figs. 4 and 4ª—that is, the length of the bale will not be materially changed, neither will its height; but its width is reduced from thirty to, say, eighteen inches, or thereabout. The bale in this condition is then retained under pressure and not allowed to expand in the direction of this compression and is then subjected to a pressure transverse to the first or at substantially right angles thereto, as in the direction of its top and bottom, and it assumes approximately the shape indicated in Figs. 5 and 5ª—that is, its length is not materially changed, although it may expand an inch or two. Its width is the same as in the preceding step, being confined against any expansion in the direction of the first compression, and its thickness has been reduced to approximately twelve inches. The bale is then confined under pressure in two transverse directions, and the bands are applied, extending around the bale, covering its sides and top and bottom, and are secured, and then when the pressure is released from the bale it expands more or less within the bands, and practically all the expansion is in the direction of the last compression, so that the bale may assume substantially the shape indicated in Figs. 6 and 6ª, being, say, sixty-two inches long, practically eighteen inches wide, and eighteen inches high, and is ready for shipment. A bale thus compressed may have a density of about forty pounds, more or less, when banded and ready for shipment.

Instead of making the first compression in the direction of its sides it may be in the direction of its top and bottom and a second compression in a direction transverse thereto, and the same general results are accomplished.

In carrying out this method of compressing the bale in two directions at substantially right angles to each other it is essential to retain the bale under the first compression while it is receiving its second compression, and then to apply the bands while it is under pressure. If the bale is released from compression in the first direction, it will expand to very nearly the amount of compression, and so to accomplish the results intended it is necessary to retain the compression resulting from the first pressure while the bale is receiving its second compression. It will also be apparent that when the bale has received its first compression and is so retained the surface area of the sides of the bale to be next compressed is largely reduced, and consequently with a press of a given power a much greater pressure per square inch will be exerted upon the bale than if the bale were of its original size, or approximately so. Furthermore, it will be seen that the bale is completely compressed in the two directions and banded without manipulating or turning the bale, and the various steps are performed successively and continuously upon the bale from the beginning to the end of the operation.

What I claim is—

1. The method substantially as hereinbefore set forth of compressing bales which have been previously formed under pressure, which consists in first pressing the bale in one direction and maintaining said bale against expansion in the direction of its pressure, then compressing the bale in a direction substantially at right angles to the first pressure while thus retained against expansion in the direction of said first pressure, and finally securing the bale by banding it in the direction of both pressures.

2. The method substantially as hereinbefore set forth of compressing bales which have been previously formed under pressure, which consists in first pressing the bale on its sides, retaining the pressed bale against expansion by maintaining the pressure against its sides, then compressing the bale in the direction of its top and bottom while retained against expansion in the direction of its sides, and securing the bale in this compressed condition.

In testimony whereof I have signed my name to this specification in the presence of two subscribing witnesses.

SAMUEL J. WEBB.

Witnesses:
F. L. FREEMAN,
W. CLARENCE DUVALL.